United States Patent [19]

Jackson, Jr. et al.

[11] Patent Number: 4,539,390

[45] Date of Patent: Sep. 3, 1985

[54] HIGH MOLECULAR WEIGHT UNSATURATED POLYESTERS OF CYCLOHEXANEDIMETHANOLS

[75] Inventors: Winston J. Jackson, Jr.; Herbert F. Kuhfuss; Joseph J. Watkins, all of Kingsport, Tenn.

[73] Assignee: Eastman Kodak Company, Rochester, N.Y.

[21] Appl. No.: 594,509

[22] Filed: Mar. 29, 1984

[51] Int. Cl.³ .............................................. C08G 65/52
[52] U.S. Cl. ...................................... 528/303; 525/43; 528/304; 528/306; 528/307
[58] Field of Search ................ 528/303, 304, 306, 307

[56] References Cited

U.S. PATENT DOCUMENTS

| | | | |
|---|---|---|---|
| 3,530,202 | 9/1970 | Fekete et al. | 528/306 X |
| 3,560,445 | 2/1971 | Fekete et al. | 528/303 |
| 3,826,805 | 7/1974 | Comstock et al. | 528/306 X |
| 3,915,936 | 10/1975 | Vollkommer et al. | 528/283 X |

*Primary Examiner*—Lucille M. Phynes
*Attorney, Agent, or Firm*—John F. Stevens; William P. Heath, Jr.

[57] ABSTRACT

Disclosed are linear, high molecular weight unsaturated polyesters prepared by reacting essentially equimolar amounts of an acid selected from maleic acid, maleic anhydride or fumaric acid and cyclohexanedimethanol at temperatures of less than about 200° C. until an I.V. of about 0.5 is reacted.

9 Claims, No Drawings

HIGH MOLECULAR WEIGHT UNSATURATED POLYESTERS OF CYCLOHEXANEDIMETHANOLS

This invention relates to high molecular weight polyesters of maleic or fumaric acid, and 1,3- or 1,4-cyclohexanedimethanol.

BACKGROUND OF THE INVENTION

It is known in the art to produce low molecular weight unsaturated polyesters and copolyesters from fumaric acid, maleic acid, or maleic anhydride with 1,3- or 1,4-cyclohexanedimethanol. These low molecular weight materials generally find use as a part of a multicomponent coating or thermoset molding formulation. These polyesters and copolyesters have molecular weights too low to be useful for the manufacture of shaped objects without the presence of other polymeric or monomeric substances. U.S. Pat. Nos. 3,674,727, 3,730,808, and 4,195,102 contain examples of such polyesters. We are aware of no prior art which discloses the preparation of linear, high molecular weight, unsaturated polyesters from fumaric acid, maleic acid, or maleic anhydride with 1,3- or 1,4-cyclohexanedimethanol.

Conventional low molecular weight unsaturated polyesters are used for copolymerization with styrene or other vinyl monomers, or for coatings which are applied to substrates as low viscosity solutions and then are thermoset by various processes. Such low molecular weight unsaturated polyesters are not suitable for use as molding compositions. Because the unsaturated polyesters according to this invention are high molecular weight, moldable compositions (as opposed to solvent systems) can be obtained. Such high molecular weight unsaturated polyester compositions result in improved physical properties such as higher tensile strength, greater impact resistance, etc., in the products produced therefrom.

DISCLOSURE OF INVENTION

According to the present invention, there are provided high molecular weight, linear, unsaturated polyesters, and a process for making such polyesters. The polyesters comprise 100 mole % of an acid component and 100 mole % of a glycol component, the acid component comprising at least 50 mole % of repeat units from maleic or fumaric acid and the glycol component consisting essentially of repeat units from 1,3-cyclohexanedimethanol or 1,4-cyclohexanedimethanol. The polyesters have an inherent viscosity (I.V.) of at least 0.5, resulting in a number average molecular weight (Mn) of at least 10,000.

The dicarboxylic acids used in the present invention are preferably fumaric acid, maleic acid or maleic anhydride. The term "acid" is intended to include anhydrides and other ester-forming derivatives of these acids. These compounds are commercially available.

The cis or trans configuration, or any combination thereof, of 1,3- or 1,4-cyclohexanedimethanol may be used. Additionally, the unsaturated acid component may be replaced by up to 50 mole % of an aliphatic, cycloaliphatic, or aromatic dicarboxylic acid, such as glutaric acid, adipic acid, azelaic acid, 1,3- or 1,4-cyclohexanedicarboxylic acid, and isophthalic acid.

High molecular weights of linear polymers such as those achieved in this invention cannot be obtained using lower aliphatic glycols (e.g., ethylene glycol) in the processes of this invention. A glass transition temperature (Tg) of at least 20° C. is preferred for the polymers of this invention. Polyesters of aliphatic glycols are not of interest because their glass transition temperatures are too low.

The polyesters of this invention may be prepared using solution or melt-phase reactions. Conventional processes may be used, except it is important that reaction temperatures be held below 200° C. and essentially equimolar quantities of acid and glycol be used. In the case of preparation in solution, a process may be used which involves conducting the esterification/polyesterification reaction in a refluxing solvent in the presence of a catalyst with azeotropic removal of the by-product, water. In both solution and melt-phase reactions essentially stoichiometric quantities of acid and glycol reactants must be used in order to build up molecular weights. The preferred catalyst, in solution, is p-toluenesulfonic acid but other conventional catalysts suitable for the esterification of carboxylic acids with aliphatic glycols may be used, such as sulfuric acid or methanesulfonic acid. Useful solvents are alkyl and chloro-substituted benzenes having boiling points of about 110° C. to 180° C. Xylene is preferred, however. Examples of other useful solvents include toluene, cumene, p-cymene, chlorobenzene, and o-dichlorobenzene. The reactants are heated in refluxing solvent with removal of the water formed and return of the condensed solvent vapors to the reaction vessel. After the theoretical yield of water has been collected, the mixture is allowed to cool to room temperature with constant stirring. Depending upon the solvent, the polyester precipitates on cooling and may be recovered by vacuum filtration. If the polyester does not precipitate, a suitable nonsolvent may be added to cause precipitation or the solvent may be removed by vacuum distillation.

In the case of melt-phase preparation, the reactants may be heated at 180° C. in the melt under an inert gas, such as nitrogen or argon, for about two hours. Vacuum is applied at 180°–200° C. until a viscous product is obtained (0.5–1.0 hour).

It is important in both solution and melt-phase reactions of this invention to limit the reaction temperature to be not greater than 200° C. to prevent crosslinking at the double bond of the acid. As a practical matter, temperatures below about 160° C. are ineffective in the melt, but temperatures as low as 100° C. can be used in solution reactions.

Though not required for either solution or melt-phase preparation, it is useful to include small amounts of a material which inhibits the polymerization reaction at the double bond. A 1:1 molar ratio mixture of hydroquinone and p-benzoquinone, at a 250 ppm level (based on theoretical polyester yield), is preferred but other substances known to exhibit this inhibiting effect may be used.

A unique feature of the present invention is that the high molecular weight unsaturated polyesters can be molded, such as by injection molding. The polyesters can be molded by conventional techniques to produce tough, transparent shaped objects. The polyesters of this invention can also be dissolved in solvents such as toluene, xylene, or methylene chloride and coatings produced therefrom. The polyesters of this invention also find use as components of dry thermoset molding compositions. Also, these polyesters can be ground to a fine particle size and used as a powder coating.

The carbon-carbon double bonds spaced within the backbone of the polyester molecules are available for chemical reactions which are common to this unit. Examples of these reactions include addition of atoms or molecules such as hydrogen, halogen, ammonia, amines, peroxides, or mercaptans and polymerization with other unsaturated moieties. These reactions are useful for modifying the physical properties of the polyesters either prior to or after processing. When applied after processing, these reactions are useful for modifying either surface or bulk properties of the polyester. These modifying reactions can be initiated either chemically or by irradiation.

In preparing polyester crosslinked resinous compositions from the modified unsaturated polyesters, they may be combined with a polymerizable, ethylenically unsaturated monomeric crosslinking agent containing a $CH_2\!=\!C\!<$ group and desirably having a boiling point at atmospheric pressure of 60° C. or greater.

Among such polymerizable compounds there are included styrene, side chain substituted styrenes such as the α-ethyl styrene, and the like, ring substituted styrenes, such as alkyl styrenes, e.g., ortho-, meta- and para-alkyl styrenes, e.g., o-methyl styrene, p-ethyl styrene, meta-propyl styrene, 2,4-dimethylstyrene, 2,5-diethylstyrene, and the like, halostyrenes, e.g., o-bromostyrene, p-chlorostyrene, 2,4-dichlorostyrene, and the like. Alkyl esters of acrylic and methacrylic acid, e.g., methyl, ethyl or butyl acrylate, methyl methacrylate, and the like, may also be employed. In addition, one may also use aliphatic vinyl esters such as vinyl acetate, vinyl butyrate, vinyl laurate, acrylonitrile, methacrylonitrile, vinyl chloride, and the like. Further, acrylamide, methacrylamide and their derivatives may be employed. Still further, one can make use of the allyl compounds such as diallyl phthalate, allyl acetate, allyl methacrylate, diallyl carbonate, allyl lactate, allyl α-hydroxyisobutyrate, allyl trichlorosilane, allyl acrylate, diallyl malonate, diallyl oxalate, diallyl gluconate, diallyl methyl gluconate, diallyl adipate, diallyl sebacate, diallyl tarronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylenetetrahydrophthalic anhydride, triallyl tricarballylate, triallyltrimesate, triallyl aconitate, triallyl cyanurate, triallyl citrate, triallyl phosphate, trimethallyl phosphate, tetrallyl silane, tetrallyl silicate, hexallyl disiloxane and the like. These polymerizable, ethylenically unsaturated monomeric cross-linking agents may be used singly or in combination with one another.

The ratio of the unsaturated polyester to the monomeric crosslinking agent may be varied over a wide range and, therefore, this ratio is not critical. For example, the unsaturated reactive resin content may range from about 10 to about 90% of the total weight of this copolymerizable mixture. For most purposes, however, the polyester resinous compositions will comprise from about 30 to 60 parts of the unsaturated resin and correspondingly from about 70 to 40 parts of the polymerizable monomer.

In order to facilitate the copolymerization of the monomeric cross-linking agent with the reactive resin, it is preferred that a polymerization catalyst be incorporated in the composition at the time of its curing. The type and amounts of these catalytic materials which may be used are well known in the art, and any material which normally induces polymerization of polyester resinous compositins can be utilized. The optimum reaction conditions are modified to some extent by the choice of the particular catalyst used in the process. A very active catalyst should be used in lower concentrations, and preferably at lower temperatures, than a less reactive material. The catalysts that are preferably employed comprise a wide variety of organic superoxides, i.e., organic peroxides ("acidic peroxides") and hydroperoxides ("alcoholic peroxides"). Mixtures of peroxides and hydroperoxides, including commercially available mixtures such as methyl ethyl ketone peroxide, cyclohexanone peroxide, and the like, are especially effective as catalysts. Among the organic peroxide catalysts that may be employed are such as acetyl peroxide, benzoyl peroxide, substituted benzoyl peroxides, and particularly halogenated benzoyl peroxides such as p-bromobenzoyl peroxide, 2,4-dichlorobenzoyl peroxide, etc., benzoyl acetyl peroxide, phthalyl peroxide, succinyl peroxide, fatty oil acid peroxides, such as coconut oil peroxide, lauryl peroxide, stearyl peroxide, oleyl peroxide, anisoyl peroxide, toluyl peroxide, and the like. Organic peracids, such as peracetic acid and perbenzoic acid, may also be employed. Among the organic hydroperoxide catalysts that may be employed are such as tertiary butyl hydroperoxide, cumene hydroperoxide, diisopropyl benzene hydroperoxide, 1-hydroxycyclohexyl hydroperoxide, the terpene oxides, such as ascaridole, 1-p-methane hydroperoxide, etc., and the like. Various other types of polymerization catalysts may also be employed, for example, compounds such as aluminum chloride, stannic chloride, boron trifluoride, or the azo-type catalysts such as α/α'-azobisisobutyronitrile.

Since the polyester constituents of the resinous compositions mentioned above contain a high degree of polymerizable unsaturation, it is often desirable to incorporate a polymerization inhibitor therewith. The inhibitor, i.e., a material whose primary function is to retard internal polymerization of the polyester constituent of the resinous composition, effects stabilization of the composition during any storage period encountered prior to curing. However, once the resinous composition is contacted with a sufficient amount of a polymerization catalyst, the effect of the inhibitor will be overcome. Among the inhibitors that may be used are such as phenol; the monoalkyl phenols, such as ortho-, meta-, and para-cresol, as well as mixtures of such isomers; polyalkyl phenols having a plurality of the same or different substituents, e.g., ethyl, propyl, butyl, and higher alkyl radicals attached to their nuclei; catechol, tertiary butyl catechol, hydroquinone, tertiary butyl hydroquinone, resorcinol, eugenol, guaiacol, pyrogallol, benzaldehyde, tannic acid, ascorbic acid, isoascorbic acid, phenylene diamine, sym-di-β-naphthyl-p-phenylene diamine, aniline, and the like. The amount of polymerization inhibitor employed depends on the nature of the polyester resinous composition as well as the period of storage stability required. Generally, from about 0.01% to 0.3% by weight, based on the total weight of polymerizable reactive components present, will be sufficient.

Inhibitors of this type may be added to the reactive resin during the preparation thereof or optionally added later to the compounded polyester resinous composition. In addition, other known additives may be employed such as promoters used in conjunction with the catalyst, mold lubricants, fillers and reinforcements, colorants, flow promoters, ultraviolet absorbing compounds, and the like.

The conditions necessary for curing the polyester resinous compositions of this invention do not depart from the practice ordinarily observed in curing this type of composition. They may be cured in contact with air or in enclosed molds at temperatures ranging from about 10° C. to about 160° C. or even higher as long as they are kept below the point at which the particular resinous composition employed begins to decompose. Where it is convenient it is especially desirable to cure the resinous compositions by heating the catalyzed, resin-forming mass to between 90° C. and about 150° C. for a period of about 3 to 90 minutes.

The polyesters and polyester resin compositions of this invention may also contain pigments, glass fibers, antioxidants, plasticizers, lubricants, and other conventional additives.

Inherent viscosities are determined at 25° C. in 60/40 phenol/1,1,2,2-tetrachloroethane at a concentration of 0.5 g/100 mL. Glass transition temperatures, $T_g$, and melting points, $T_m$, are determined on a Perkin-Elmer DSC-2 differential scanning calorimeter. Gel permeation chromatography (GPC) analyses are performed in m-cresol at 100° C. on a Waters 100 instrument.

The following examples are submitted for a better understanding of the invention.

EXAMPLE 1

A mixture of 46.4 g (0.40 mol) fumaric acid, 57.7 g (0.40 mol) 1,4-cyclohexanedimethanol (30/70 cis/trans isomer ratio), 0.9 g (1 wt. % based on theoretical polyester yield) p-toluenesulfonic acid, 0.02 g (250 ppm based on theoretical polymer yield) methylhydroquinone, and 150 mL xylene is placed into a 500-mL, three-neck, round-bottom flask equipped with a stirrer, an argon inlet, and a Dean-Stark trap with condenser. The mixture is stirred at 138°–140° C. until the theoretical yield of water has been collected in the trap (five hours) and the solution is viscous. The mixture is allowed to cool to room temperature with constant stirring. The polyester is recovered by vacuum filtration as a white powder. It has an I.V. of 0.85, a $T_g$ at 47° C., a $T_m$ at 161° C., and Mn of 16,400 by GPC.

After pelletizing, the polyester is molded at 180° C. to give transparent molded test bars with a tensile strength of 464 Kg/cm$^2$ (6,600 psi) with 120% elongation at break and notched Izod impact strength, at 23° C., of 9 joules/cm (17 ft.-lb./in.).

EXAMPLE 2

Following the procedure described in Example 1, a polyester is prepared from maleic anhydride and 1,4-cyclohexanedimethanol (30/70 cis/trans ratio). The polyester has an I.V. of 0.71, a $T_g$ at 22° C., and a $T_m$ at 110° C.

EXAMPLE 3

A mixture of 17.4 g (0.15 mol) fumaric acid, 21.6 g (0.15 mol) 1,4-cyclohexanedimethanol (30/70 cis/trans ratio), 0.004 g (250 ppm based on theoretical polymer yield) hydroquinone, 0.004 g (250 ppm based on theoretical polymer yield) p-benzoquinone, and 0.17 g (1 wt. % based on theoretical polymer yield) p-toluenesulfonic acid is placed into a 100-mL, single-neck, round-bottom flask equipped with a stirrer and a short distillation head with provisions for maintaining an argon flow and applying vacuum. After an argon atmosphere is established, the flask is heated at 150° C. for 1 hour, then 180° C. for 1 hour with stirring. Vacuum is applied at 180° C. for 0.4 hour. The resulting polyester has an I.V. of 0.63.

EXAMPLE 4

Following the procedure described in Example 3, a polyester is prepared from maleic anhydride and 1,4-cyclohexanedimthanol (30/70 cis/trans ratio). The resulting polyester has an I.V. of 0.62 and Mn of 13,200 by GPC.

EXAMPLE 5

Following the procedure described in Example 3, a copolyester is prepared from 0.8 mol fumaric acid, 0.2 mol isophthalic acid, and 1.0 mol 1,4-cyclohexanedimethanol (30/70 cis/trans ratio). A transparent polyester with an I.V. of 0.53 and $T_g$ at 50° C. is obtained.

The invention has been described in detail with particular reference to preferred embodiment thereof, but it will be understood that variations and modifications will be effected within the spirit and scope of the invention.

We claim:

1. A linear unsaturated polyester comprising 100 mole % of an acid component and 100 mole % of a glycol component, said acid component comprising at least 50 mole % of repeat units from maleic or fumaric acid, and said glycol component consisting essentially of repeat units from 1,3-cyclohexanedimethanol, 1,4-cyclohexanedimethanol or mixtures thereof, said polyester having an I.V. of at least 0.5.

2. A linear unsaturated polyester wherein said acid component comprises at least 50 mole % of repeat units from maleic acid or maleic anhydride.

3. A linear unsaturated polyester wherein said acid component comprises at least 50 mole % of repeat units from fumaric acid.

4. A linear unsaturated polyester wherein said glycol component consists essentially of 1,3-cyclohexanedimethanol.

5. A linear unsaturated polyester wherein said glycol component consists essentially of 1,4-cyclohexanedimethanol.

6. A linear unsaturated polyester according to claim 1 having a glass transition temperature of at least 20° C.

7. A molded article of manufacture comprising the polyester of claim 1.

8. A molded article of manufacture consisting essentially of the polyester of claim 1.

9. A process for preparing linear, high molecular weight polyesters which comprises reacting about 100 mole % of an acid component comprising at least 50 mole % maleic acid, maleic anhydride or fumaric acid with about 100 mole % of a glycol component consisting essentially of 1,3-cyclohexanedimethanol or 1,4-cyclohexanedimethanol at a temperature of between about 160° C. and about 200° C. until an I.V. of at least 0.5 is reached.

* * * * *

UNITED STATES PATENT AND TRADEMARK OFFICE
CERTIFICATE OF CORRECTION

PATENT NO. : 4,539,390
DATED : September 3, 1985
INVENTOR(S) : W. J. Jackson, Jr.; H. F. Kuhfuss; J. J. Watkins It is certified that error appears in the above-identified patent and that said Letters Patent is hereby corrected as shown below:

In column 6, line 37, after "polyester" insert ---according to Claim 1---.

In column 6, line 40, after "polyester" insert ---according to Claim 1---.

In column 6, line 43, after "polyester" insert ---according to Claim 1---.

In column 6, line 46, after "polyester" insert ---according to Claim 1---.

Signed and Sealed this

Twenty-first Day of January 1986

[SEAL]

Attest:

Attesting Officer

DONALD J. QUIGG

Commissioner of Patents and Trademarks